Figures 1, 2:
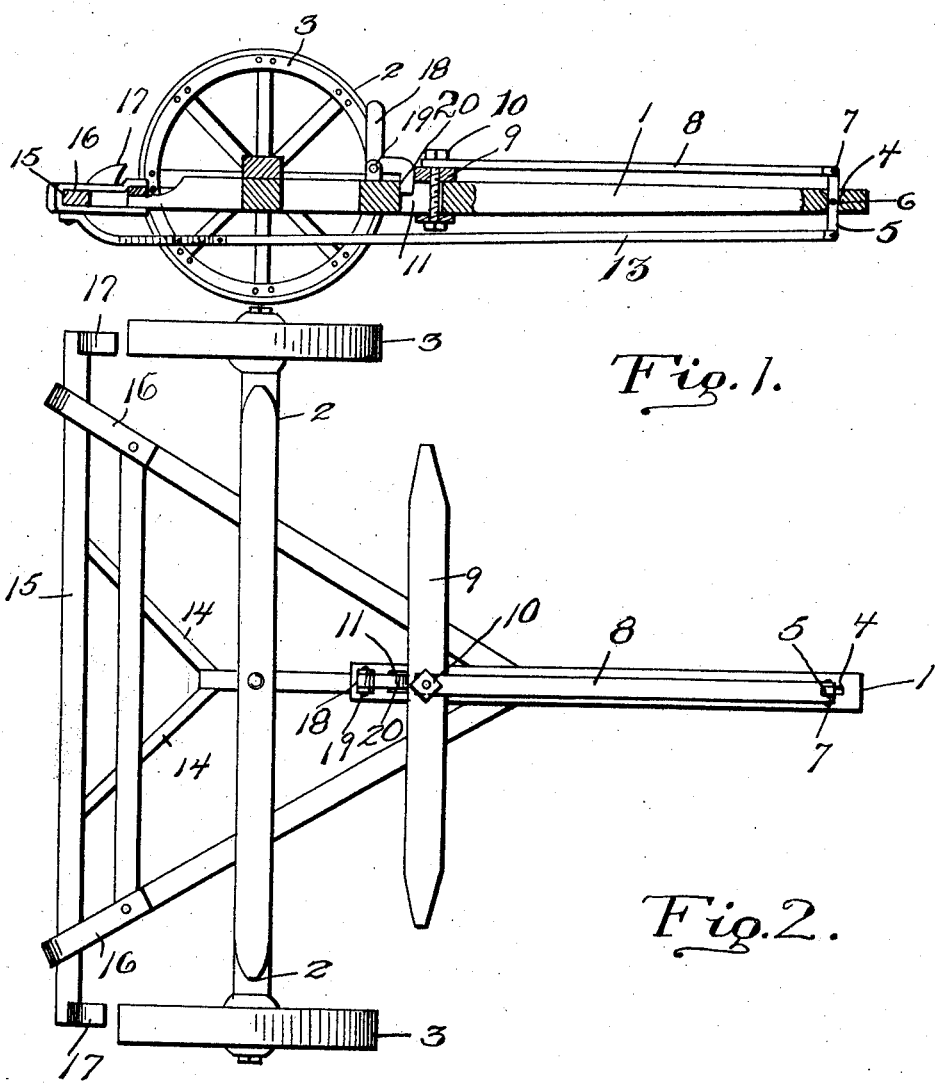

R. A. BOUTWELL.
VEHICLE BRAKE.
APPLICATION FILED DEC. 22, 1910.

1,034,188.

Patented July 30, 1912.

Witnesses
M. M. Beall
S. W. Cook

Inventor
R. A. Boutwell.
By Wm. C. McIntire
Attorney

COLUMBIA PLANOGRAPH CO., WASHINGTON, D. C.

UNITED STATES PATENT OFFICE.

RANDOLPH A. BOUTWELL, OF TROY, ALABAMA.

VEHICLE-BRAKE.

1,034,188.                Specification of Letters Patent.      Patented July 30, 1912.

Application filed December 22, 1910. Serial No. 598,776.

*To all whom it may concern:*

Be it known that I, RANDOLPH A. BOUT-WELL, a citizen of the United States, residing at Troy, in the county of Pike and State of Alabama, have invented certain new and useful Improvements in Vehicle-Brakes, of which the following is a specification.

This invention relates to improvements in vehicle brakes, and particularly to that class operated by the action of the animals attached to the vehicle.

The device is simple, inexpensive, and positive in its operation. It can be easily attached to any form of vehicle in a very short time. In going down a hill the vehicle will tend to force the animals forward. This action is made use of in the device, and the construction is such that when the animals begin to pull back on the tongue of the vehicle, the brake immediately comes into action. In the same way, if the animals are unruly, and against the wishes of the driver begin to back, the brakes are automatically applied and the liability of an accident averted. To make it possible to back the vehicle when desired, a locking device is provided to render the brakes inoperative.

With the above and other objects in view, this invention resides in the novel features of construction, formation, combination and arrangement of parts to be hereinafter more fully described, claimed, and illustrated in the accompanying drawing, in which—

Figure 1 is a partial vertical section through the tongue of a vehicle showing the device applied, and Fig. 2 is a top elevation of the device as applied to a vehicle.

Referring to the drawing by characters of reference, the numeral 1 represents a draft tongue, secured in the usual manner to the axle 2, on the ends of which are mounted the wheels 3. At the outer end of the tongue is provided an opening 4, through which is passed the rod or lever 5, pivoted on the pin 6, and at its upper end fastened by means of a bolt 7 to a rod 8, extending along the upper side of the tongue 1 and fastened to the double trees 9. The double trees 9 are slidably mounted on the tongue 1 by means of a bolt 10, passing through a slot or opening 11. At the lower end of the pivoted rod 5 is bolted a rod 13, extending along the under side of the tongue 1 and branching into Y-shaped arms 14, the ends of which are attached to a cross beam 15, slidably mounted in brackets 16 attached to the forked rear ends of the tongue and having mounted on its ends the brake shoes 17 for acting on the periphery of the wheels 3. A lever 18 is pivoted at the point 19 to the top of the tongue in the rear of the double trees, having at its lower end a plug 20 to be inserted in the slot or opening 11 when the brakes are released and thus rendering them inoperative. The ring on the neck yoke is fastened to the upper end of the rod or lever 5, and through this means the device is actuated.

Having thus fully described this invention, what I claim as new and desire to secure by Letters Patent is:

A vehicle brake, comprisng in combination with an axle, wheels rotatably mounted on said axle, a tongue secured to said axle, provided with a longitudinal slot adjacent to its rear terminal, rearwardly extending divergent arms carried by said tongue, brackets carried at the rear ends of said arms, a brake beam mounted for reciprocation in said brackets, brake shoes carried at the terminals of said beam for coöperation with said wheels, a cross tree mounted for reciprocation on said tongue, a bolt piercing said cross tree and tongue, a vertical lever pivoted in the forward terminal of the tongue aforesaid, a rod pivoted to said lever on the upper side of the tongue and secured to the cross tree by said bolt, a rod pivoted to the lower terminal of the lever on the under side of the tongue, divergent arms formed at the rear terminal of the said last named rod and rigidly connected to the brake beam aforesaid, a bell crank formed on said tongue in the rear of the cross tree, and a dependent projection formed on the horizontal arm of the bell crank, adapted to be received in the slot formed in the tongue at the rear of the cross tree, thereby locking said cross tree from reciprocation.

In testimony whereof I affix my signature by cross-mark in presence of two witnesses.

RANDOLPH A. X BOUTWELL.
mark

Witnesses:
V. A. GIBSON,
C. T. SPRADLEY.

Copies of this patent may be obtained for five cents each, by addressing the "Commissioner of Patents, Washington, D. C."